United States Patent
Hedinsson et al.

(10) Patent No.: US 8,793,282 B2
(45) Date of Patent: Jul. 29, 2014

(54) REAL-TIME MEDIA PRESENTATION USING METADATA CLIPS

(75) Inventors: Skarphedinn Hedinsson, Stevenson Ranch, CA (US); Ariff Sidi, Studio City, CA (US); David Watson, Valencia, CA (US); Yii Lih Liu, Cerritos, CA (US); Jonathan Barsook, Los Angeles, CA (US); Jason R. Grant, Valencia, CA (US); Christopher White, Redmond, WA (US)

(73) Assignee: Disney Enterprises, Inc., Burbank, CA (US)

( * ) Notice: Subject to any disclaimer, the term of this patent is extended or adjusted under 35 U.S.C. 154(b) by 188 days.

(21) Appl. No.: 12/386,198

(22) Filed: Apr. 14, 2009

(65) Prior Publication Data

US 2010/0262618 A1 Oct. 14, 2010

(51) Int. Cl.
*G06F 17/30* (2006.01)
(52) U.S. Cl.
USPC .......................................... 707/796; 386/290
(58) Field of Classification Search
USPC .......................................... 707/796; 386/290
See application file for complete search history.

(56) References Cited

U.S. PATENT DOCUMENTS 7,725,829 B1 * 5/2010 Wong et al. .................... 715/726
8,209,609 B2 * 6/2012 Dunton et al. ................. 715/716
2003/0093790 A1 * 5/2003 Logan et al. .................... 725/38
2005/0005308 A1 * 1/2005 Logan et al. ................... 725/135
2008/0313227 A1 * 12/2008 Shafton et al. .............. 707/104.1

OTHER PUBLICATIONS

"Microsoft Computer Dictionary", Microsoft Press, 5th ed. (2002), definitions of "stream" and "streaming".*
Ryan Shaw & Patrick Schmitz, "Community Annotation and Remix: A Research Platform and Pilot Deployment", ACM HCM, Oct. 27, 2006, pp. 89-98.*
Rene Kaiser et al., "Metadata-driven Interactive Web Video Assembly", Springer Science + Business Media, published online Oct. 30, 2008, pp. 437-467.*
Ronen Brafman & Doron Friedman, "Adaptive Rich Media Presentations via Preference-Based Constrained Optimization", 2006, Dagstuhl Seminar Proceedings 04271, pp. 1-6.*

* cited by examiner

*Primary Examiner* — Rehana Perveen
*Assistant Examiner* — Scott A Waldron
(74) *Attorney, Agent, or Firm* — Farjami & Farjami LLP

(57) ABSTRACT

There is provided a system and method for real-time media presentation using metadata clips. There is provided a media device for providing one or more media files for a display, the media device including a memory and a processor. The memory includes a plurality of metadata clips, wherein each of the plurality of metadata clips references a referenced source media from the media files, a referenced start position, and a referenced end position. The processor can determine a playlist including some of the plurality of metadata clips for streaming segments of media files as defined by their referenced start and end positions. Flexible behaviors can also be added to enhance playback logic or to enforce access restrictions, and metadata clips and playlists may also be user generated.

16 Claims, 4 Drawing Sheets

REAL-TIME MEDIA PRESENTATION USING METADATA CLIPS

BACKGROUND OF THE INVENTION

1. Field of the Invention

The present invention relates generally to media playback. More particularly, the present invention relates to processing and presentation of media content.

2. Background Art

On-demand streaming media has become one of the most popular methods of media consumption. By offering users the ability to choose amongst a wide variety of user generated and commercially produced content, and by offering the convenience of anytime, anywhere access with an available Internet connection, on-demand media streaming has solidified its position as a killer application for today's wired media age. However, precisely because streaming media offers such a wealth of choices to the user, it may be difficult to navigate to relevant or interesting portions of the vast amount of media content available.

One way of manageably presenting from such a large catalog of media is to present only clips, or smaller subsections of larger media. This way, the user can selectively view only the segments of interest. However, to provide such clip viewing functionality, many services require that a completely separate media clip be generated from the original media, which results in inefficient use of server resources through redundant content. Due to scarce storage, bandwidth, and processing resources, users may find themselves limited in the amount of media content they can provide and view.

Besides clip segments, user variations or alternative versions of original media content can provide further options for tailoring content to user interests. For example, parodies using fake captions or replaced audio tracks can enhance the entertainment value of content, and also enables users to participate in the content creation process. Remixing and juxtaposing clips may also be a desirable feature, as well as adding intelligent playback behaviors. However, existing streaming video applications provide only a limited amount of user input for the manipulation of media streaming behavior, with acceptable user input typically limited to merely playback manipulation of a single media source without any further creative input. Users must therefore learn complex video editing software to achieve a desired result, a technical barrier that many users cannot surmount. Moreover, the resulting edited media requires its own hosting, storage, and distribution, which may be difficult to secure, particularly if a user is a prolific media content editor.

Accordingly, there is a need to overcome the drawbacks and deficiencies in the art by providing a way to present and modify streaming media in a flexible manner optimized for efficient resource usage.

SUMMARY OF THE INVENTION

There are provided systems and methods for real-time media presentation using metadata clips, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for real-time media presentation using metadata clips. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
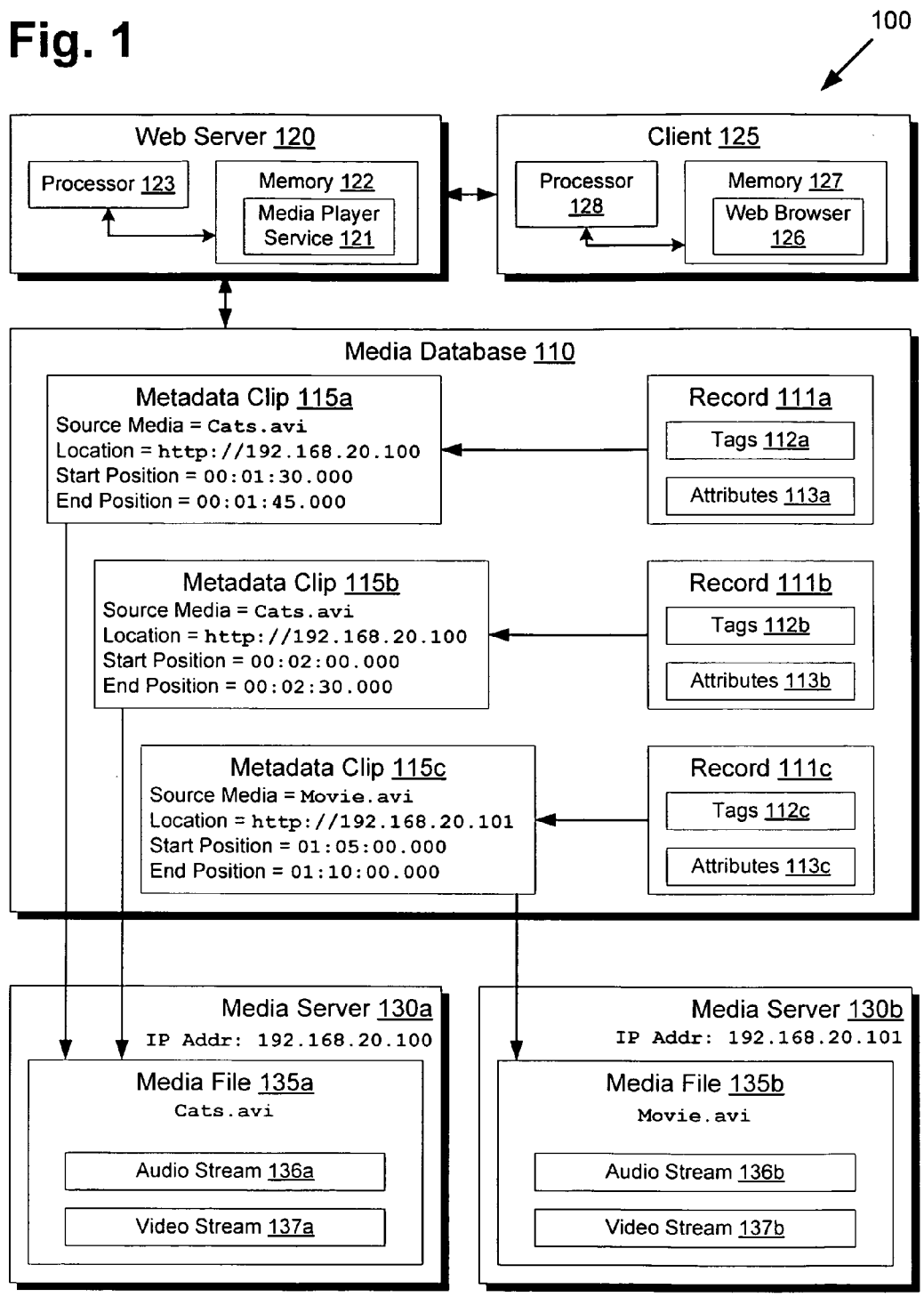
FIG. 1 presents a block diagram of a media database for supporting real-time media presentation using metadata clips, according to one embodiment of the present invention.

FIG. 1 presents a block diagram of a media database for supporting real-time media presentation using metadata clips, according to one embodiment of the present invention. Environment 100 of FIG. 1 includes media database 110, web server 120, client 125, and media servers 130*a*-130*b*. Media database 110 includes records 111*a*-111*c* and metadata clips 115*a*-115*c*. Record 111*a* contains tags 112*a* and attributes 113*a*, record 111*b* contains tags 112*b* and attributes 113*b*, and record 111*c* contains tags 112*c* and attributes 113*c*. Web server 120 includes processor 123 and memory 122 storing media player service 121. Client 125 includes processor 128 and memory 127 storing web browser 126. Media server 130*a* includes media file 135*a*, which includes audio stream 136*a* and video stream 137*a*. Media server 130*b* includes media file 135*b*, which includes audio stream 136*b* and video stream 137*b*.

Environment 100 presents an overview of various components to support media streaming to a user at client 125. Client 125 may comprise, for example, a personal computer, a set-top box, a videogame console, a mobile device, or some other device in communication with web server 120 over a communication network, such as the Internet. Processor 128 may execute web browser 126 from memory 127 to establish a connection from client 125 to web server 120. Processor 123 of web server 120 may be executing media player service 121 from memory 122, which may comprise a hosted application that interfaces with media database 110 for presenting a media player interface to client 125 using Flash, Java, Hypertext Markup Language (HTML), and other web technologies interpretable by web browser 126. Although only a single client and a single web server are shown for simplicity in environment 100, alternative embodiments may serve multiple clients and utilize multiple web servers for load balancing, availability, or for other reasons. Additionally, although only three metadata clips and two media servers are shown for simplicity in FIG. 1, a commercial implementation may include thousands or even millions of metadata clips to reference a similarly large library of media files hosted on several different media servers.

In alternative embodiments, a different web server may remotely access media player service 121 through an Application Program Interface (API) or through web standard protocols such as Simple Object Access Protocol (SOAP), Extensible Markup Language (XML), and HTTP (Hypertext Transfer Protocol). This may allow, for example, embedding a player widget on a personal website, a social networking site, a message board, or any other web destination, or extending a player widget with additional functionality using other web services. Although web centric protocols are used for environment 100, alternative protocols may also be used in other embodiments. For example, a standalone media player and service executable could be distributed to client 125, allowing client 125 to interface directly with media database 110. In alternative embodiments, client 125 might comprise a tightly integrated embedded system with built-in media player capabilities. Thus, a web server may not always be used as an intermediary, but may be included in many usage scenarios.

In media database 110, a plurality of metadata clips are stored and associated with records containing further information for the metadata clips. In FIG. 1 specifically, metadata clips 115a-115c are each respectively associated with records 111a-111c. This allows each metadata clip to be associated with additional metadata, information, references to other data, and other helpful data for providing more robust search, navigation, and player functionality for media player service 121. For example, media published on the Internet, such as video clips, images, and audio, are often "tagged" with descriptive tags by moderators or users, which can be stored in tags 112a-112c. Search algorithms may use these tags to find media keyed to the user's interests. For example, tags might indicate media genres, authorship, media content, categories, ratings, time periods, and other information that may be helpful for sorting through large media catalogues. Attributes 113a-113c may also indicate additional information regarding metadata clips 115a-115c besides the information already provided through tags 112a-112c. For example, attributes 113a-113c may indicate source quality information, such as video format, compression codecs and bit-rates, video resolution, audio sampling rate, number of audio channels, and other information regarding source media quality. Additionally, attributes 113a-113c may include metadata needed to support digital rights management (DRM), if implemented, and other access and permission schemes. Attributes 113a-113c may also include statistical information, such as access logs or user ratings, to help gauge popularity for organizing search results.

These attributes may be helpful for media player service 121 to serve the most appropriate content to client 125. For example, web browser 126 may report to media player service 121 the capabilities of client 125, such as screen resolution, video window size, processor speed, sound output configuration, and other details. If, for example, multiple quality variations are available for metadata clips referencing the same content, media player service 121 can read attributes 113a-113c to choose a metadata clip providing optimal quality, considering hardware constraints at client 125. Additionally, media player service 121 may also test a connection speed with client 125, allowing the matching of metadata clips of varying bandwidth requirements to varying network conditions, maintaining a high quality user experience even during network congestion. As previously mentioned, access logs can also provide some information about the popularity of particular metadata clips, and media player service 121 could be configured to present the most popular metadata clips first, as determined by total access counts, user ratings, or some other metric. Since other information besides access counts and user ratings can be stored in media database 110, media searches can scale to arbitrary complexity and can match against any number of different attributes.

Metadata clips 115a-115c, stored in media database 110, only provide a reference to the actual media files to be served to client 125. Metadata clips may reference the same referenced source media, or may reference different referenced source media. As shown in FIG. 1, metadata clips 115a-115b refer to different segments of the same media file 135a on media server 130a, whereas metadata clip 115c refers to a segment of media file 135b on media server 130b. By accessing metadata clips from media database 110, media player service 121 is enabled to flexibly playback portions of media files from any media server. Conventionally, to provide clip segments from a longer media file, or to combine multiple clip segments into a continuous sequential stream, a completely separate media file needs to be generated, as typical media player services and applications are only configured to playback media files from start to completion. However, media player service 121 can flexibly stream in real-time to web browser 126 from any arbitrary media file segments by using metadata clips provided by media database 110, without the need to generate separate media files.

For example, assume media player service 121 is requested to stream metadata clip 115a from media database 110. As shown in FIG. 1, metadata clip 115a includes information for media player service 121 to locate the actual referenced source media file, with a filename of "Cats.avi." In alternative embodiments, a hash value and a file database may be used instead of accessing by filename directly. Additionally, metadata clip 115a includes location information for retrieving the actual referenced source media file from a network, in the form of a uniform resource locator (URL) pointing to media server 130a via an Internet Protocol (IP) address. Media server 130a may, for example, reside on a local intranet shared with web server 120, preventing outside third parties from directly accessing media server 130a. Media server 130b may also be present on the same local intranet. With the above location information available to media player service 121, media file 135a can be located and retrieved.

Additionally, since metadata clip 115a specifies the portion of media file 135a that will be demanded, media player service 121 can retrieve only the portion that is necessary for streaming to web browser 126. Metadata clip 115a specifies the clip has a referenced start position of 00:01:30.000, or one minute thirty seconds, and a referenced end position of 00:01:45.000, or one minute forty five seconds. In alternative embodiments, metadata clip 115a may instead specify a length or duration of playback, from which the referenced end position can be derived.

Thus, rather than retrieving the entire contents of media file 135a, media player service 121 might retrieve only a portion of media file 135a necessary to support playback from 00:01:30.000 to 00:01:45.000. Additionally, if a metadata clip 115a only specified video or audio portions, then transfer of audio stream 136a or video stream 137a could also be omitted. If media file 135a is a particularly long media file, this can help conserve network and processing resources, reducing costs of operation and providing a better end user experience.

For example, web browser 126 may access media player service 121, which presents a player interface allowing a user to search for videos. The player interface might present a list of broad topics to choose as a list of tags, from which the user clicks the "Animals" tag. Media player server 121 then queries media database 110 to provide all available metadata clips matching the "Animals" tag. Records 111*a*-111*c* of media database 110 are thus searched, and tags 112*a*-112*c* can be matched against the "Animals" tag, which may be present for record 111*a* and record 111*b*. Attributes 113*a* might indicate that metadata clip 115*a* has been viewed 500 times, whereas attributes 113*b* might indicate that metadata clip 115*b* has been viewed 100 times. Thus, when media player service 121 presents the results, it can show metadata clip 115*a*, the more popular clip first, and metadata clip 115*b* second. Media player server 121 may present the resulting clips for individual selection, or may play them sequentially in a playlist.

Figure 2:
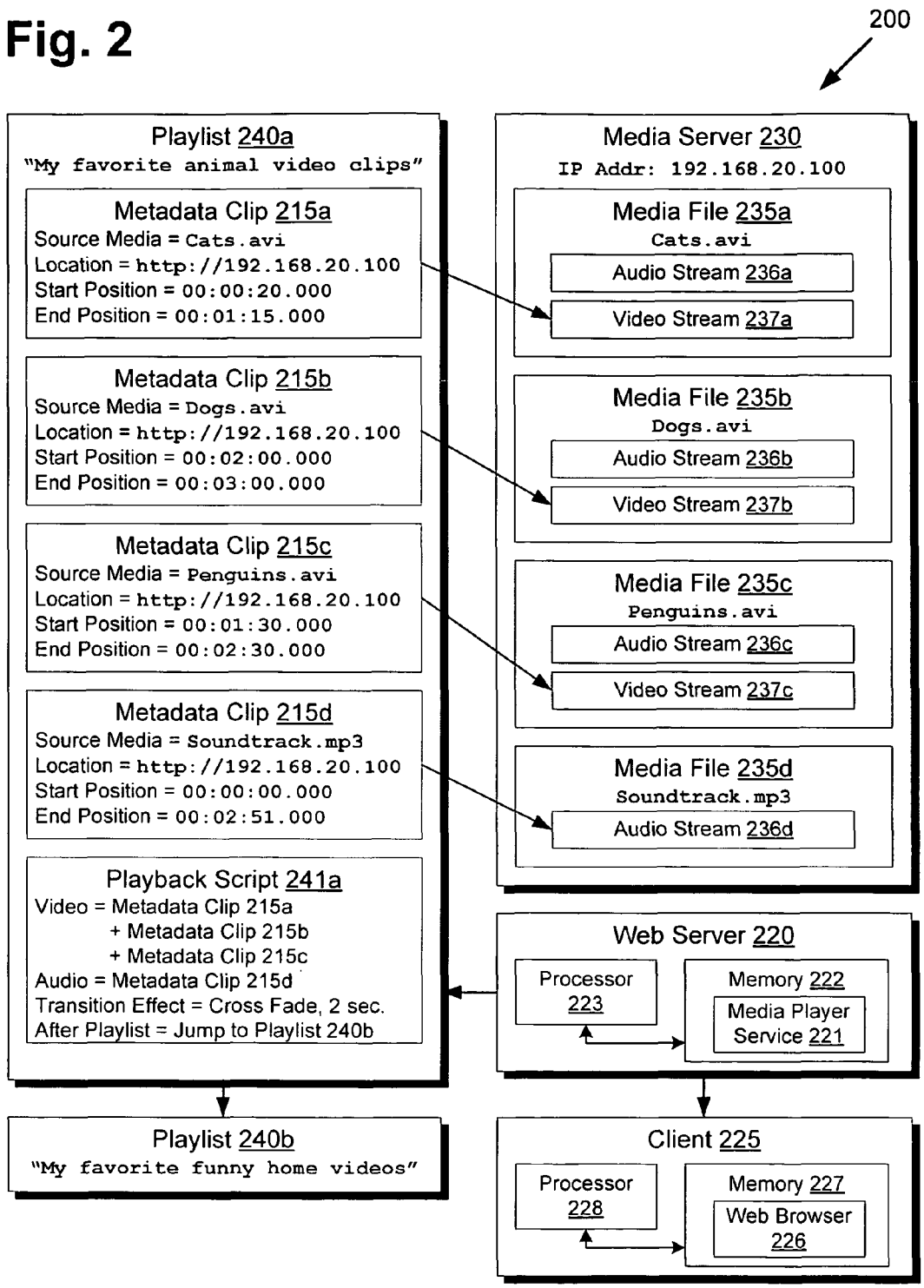
FIG. 2 presents a block diagram of a system for real-time media presentation using metadata clips, according to one embodiment of the present invention.

FIG. 2 presents a block diagram of a system for real-time media presentation using metadata clips, according to one embodiment of the present invention. Environment 200 includes web server 220, client 225, playlists 240*a*-240*b*, and media server 230. Web server 220 includes processor 223 and memory 222 storing media player service 221. Client 225 includes processor 228 and memory 227 storing web browser 226. Media server 230 includes media files 235*a*-235*d*. Media file 235*a* includes audio stream 236*a* and video stream 237*a*. Media file 235*b* includes audio stream 236*b* and video stream 237*b*. Media file 235*c* includes audio stream 236*c* and video stream 237*c*. Media file 235*d* includes audio stream 236*d*. Playlist 240*a* includes metadata clips 215*a*-215*d* and playback script 241*a*. With respect to FIG. 2, it should be noted that web server 220 corresponds to web server 110 from FIG. 1, that client 225 corresponds to client 115 from FIG. 1, and that media server 230 corresponds to media servers 130*a*-130*b*.

Playlist 240*a* shows an example of how multiple metadata clips can be arranged together to form one continuous sequential media stream viewable by a user. Playback script 241*a* gives media player service 221 some guidance on how to interpret metadata clips 215*a*-215*d*. Examining the contents of playback script 241*a*, processor 223 of web server 220 executing media player service 221 from memory 222 should stream to processor 228 of client 225 executing web browser 226 from memory 227, the referenced video from metadata clips 215*a*, 215*b*, and 215*c*, in order, accompanied by the referenced audio from metadata clip 215*d*. By choosing a separate audio stream, disparate video clips can be unified with a continuous background soundtrack, rather than being interrupted by individual audio streams. For example, media files 235*a*-235*c* may each be set to a different song, but playlist 240*a* can specify an external soundtrack, media file 235*d*, to maintain audio consistency through playlist 240*a*. Multiple audio tracks might be specified to play concurrently at varying volume levels to support, for example, audio commentary mixed with an original audio track playing softly in the background.

As shown in FIG. 2, media player service 221 therefore only needs to access video stream 237*a*, video stream 237*b*, video stream 237*c*, and audio stream 236*d*. Audio streams 236*a*-236*c* can be left alone, and unused portions of video streams 237*a*-237*c* can also be left alone, allowing web server 220 to stream content more efficiently. Additionally, since only references to media files 235*a*-235*c* are needed, storage usage can be optimized as well, since a new media file does not need to be generated and stored for accommodating playlist 240*a*.

Playback script 241*a* may contain other details besides the playback ordering of metadata clips. For example, visual effects such as transition effects can be specified, where a two second cross fading effect is chosen for video transitions between video clips in playlist 240*a*. References to captions, subtitles, image overlays, commentary, external web links, and other related content could also be included in playback script 241*a*.

Event behaviors can also be implemented as well during playback, to provide more robust playback behaviors than simply playing media from start to finish. Playback start, playback end, rewinding, muting, pausing, and other events may trigger these playback behaviors. In playback script 241*a*, for example, one such event behavior is that after playlist 240*a* finishes playback, playback should continue onto a separately externally referenced playlist 240*b*. Thus, processor 223 executing media player service 221 can automatically continue playback using externally referenced playlist 240*b*, whose contents are omitted from FIG. 2 for brevity.

This playlist ability to reference external playlists can be extended to implement a hierarchical playlist structure, with inherited behaviors and properties. For example, a master playlist could reference several sub-playlists, with global behaviors defined in the master playlist that are inherited by the sub-playlists. Additionally, the sub-playlists can include independent behaviors besides the inherited behaviors, or themselves reference other hierarchical playlists. With processor 223 processing these external playlists recursively through media player service 221, these hierarchical playlist structures can be readily traversed for any arbitrary number of hierarchical levels.

In another example, playback script 241*a* may specify a continuing playback after the processing of playlist 240*a*, or where the continuing playback begins using the last referenced source file and the last referenced end position as a new start position. In this case, playback would continue at video stream 237*c* and audio stream 236*d*, using the referenced 00:02:30.000 video end position as a new video start position and the referenced 00:02:51.000 audio end position as a new audio start position. Playback may continue until video stream 237*c* or audio stream 236*d* ends. If video stream 237*c* and audio stream 236*d* do not end concurrently, then a black screen may be shown for missing video, and silence may be substituted for missing audio.

In alternative embodiments, various conditions can be attached to these event behaviors. During playback, these conditions can be monitored for completion before implementing the associated event behaviors. For example, instead of unconditionally jumping to playlist 240*b* at the end of playlist 240*a*, a button might be overlaid on top of video playback on web browser 226, with the message "Click here to watch my favorite funny home videos!" If the user clicks the button, then media player service 221 may process that click event to jump directly to playlist 240*b*, even during the middle of playback. If playlist 240*a* instead comprised a collection of music videos for an artist, playback script 241*a* could include event behaviors where clicks on the video window took the user to an e-commerce site selling the associated album or other merchandise. Another event behavior could be included where pausing the video playback brings up an informational pane providing links to tour dates and an official website for the artist. Yet another event behavior might automatically display subtitles if the user mutes the audio. These event behaviors can enhance the user's viewing experience by reacting intelligently to user actions, providing relevant or related information, and accessing related media.

Additionally, these event behaviors may also be utilized to limit media access as well, to enforce user registration and login restrictions, to implement trial periods, or for other purposes. For example, a teaser selection of a longer media playlist might be presented to the user, where after a predetermined time of media playback, processing of the playlist is terminated and the user is prompted to provide login credentials or sign-up as a new member to resume playback of the playlist. Alternatively, playback may continue, but the event behaviors may specify randomly interspersed prompts pausing playback and exhorting the user to register or login.

Figure 3:
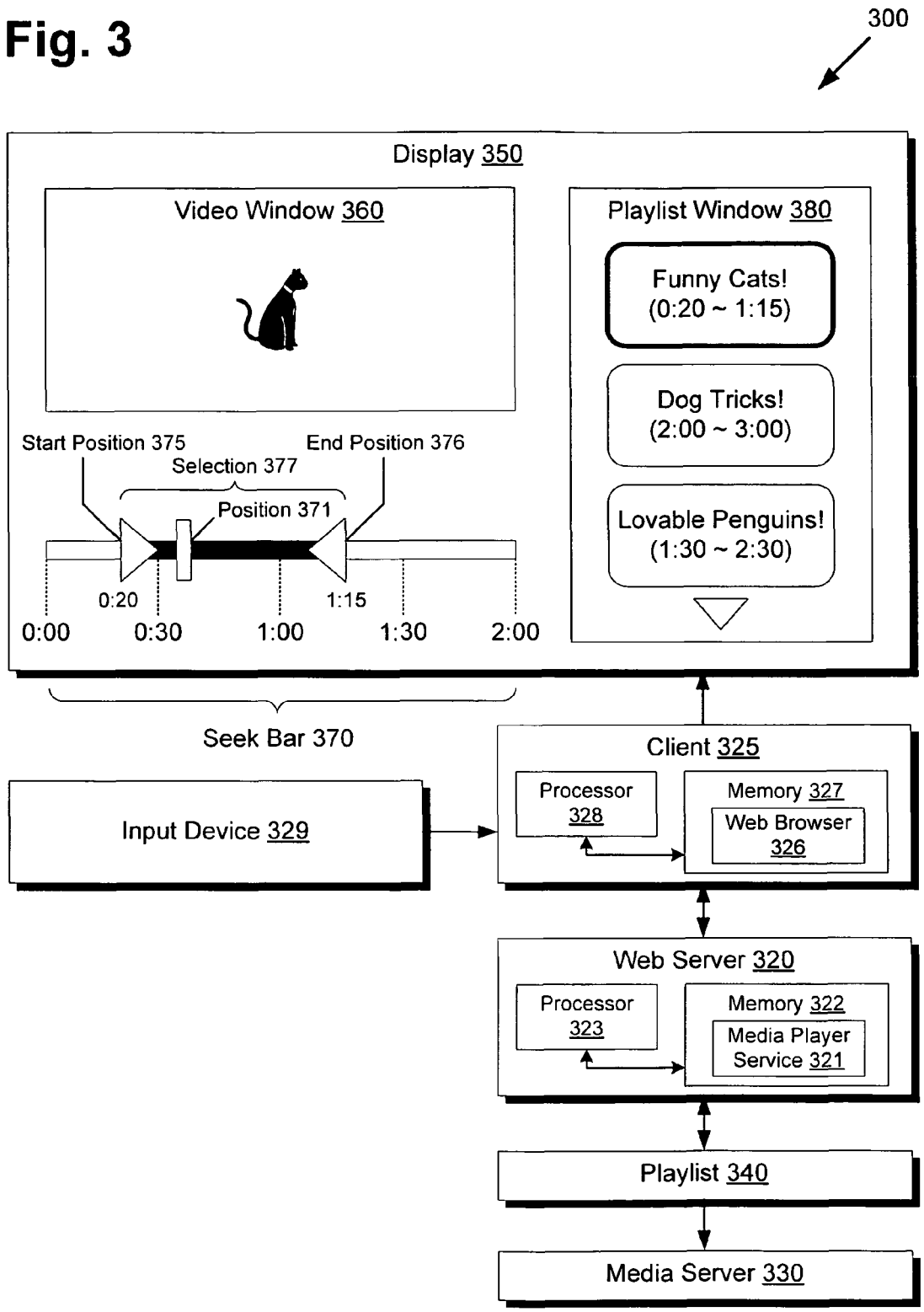
FIG. 3 presents a block diagram of a media device for providing one or more media files for a display using metadata clips, according to one embodiment of the present invention.

FIG. 3 presents a block diagram of a media device for providing one or more media files for a display using metadata clips, according to one embodiment of the present invention. Environment 300 includes web server 320, client 325, input device 329, media server 330, playlist 340, and display 350. Web server 320 includes processor 323 and memory 322 storing media player service 321. Client 325 includes processor 328 and memory 327 storing web browser 326. Display 350 includes video window 360, seek bar 370, position 371, start position 375, end position 376, and playlist window 380. With respect to FIG. 2, it should be noted that web server 320 corresponds to web server 220 from FIG. 1, that client 325 corresponds to client 225, that media server 330 corresponds to media server 230, and that playlist 340 corresponds to playlist 240a.

In FIG. 3, processor 328 of client 325 executing web browser 326 from memory 327 and processor 323 of web server 320 executing media player service 321 from memory 322 provide a client-server web based model for providing media files on display 350. In this model, web server 320 acts as the primary media device for handling media retrieval and logic processing, whereas client 325 via web browser 326 interprets a player interface provided by media player service 321 to output to display 350. As previously discussed, other models could be adopted, such as an integrated system on a single device, where client 325 and web server 320 are combined into one media device.

Display 350 shows a simplified player interface example that may be presented by web browser 326 through media player service 321. The components of display 350 might be contained within a larger browser window, with video window 360 displaying a video of cats to the upper-left, seek bar 370 updated below, and playlist window 380 displayed to the right. Playlist window 380 shows a sequential listing of metadata clips contained in the currently playing playlist, corresponding to playlist 240a of FIG. 2, with a presently playing metadata clip highlighted by a thicker border. As shown in FIG. 3, the title description "Funny Cats!" applies to metadata clip 215a, or the referenced media "Cats.avi," whereas the title description "Dog Tricks!" applies to metadata clip 215b, or the referenced media "Dogs.avi," and the title description "Lovable Penguins!" applies to metadata clip 215c, or the referenced media "Penguins.avi." These title descriptions might be embedded within records of a database, as shown in FIG. 1.

Within seek bar 370, various components are shown to give a visual indication of various location offsets and segments. Staggered time markings are provided on seek bar 370 to give a visual indication of time versus display width, and time markings are also provided directly for start position 375 and end position 376. Position 371 may be updated as media playback advances to reflect a present position within the presently playing metadata clip. Start position 375, shown as a right facing triangle, shows the start position corresponding to the currently playing metadata clip. End position 376, shown as a left facing triangle, shows the end position corresponding to the currently playing metadata clip. Selection 377, filled in black, shows the segment of playback time defined by start position 375 and end position 376.

Although only a single set of position indicators and one selection is shown on seek bar 370, multiple position indicators and selections may be possible where several metadata clips reference the same source media file. For example, if playlist 340 instead contained metadata clip 115a and metadata clip 115b from FIG. 1, then two sets of start positions, end positions, and selections may be shown on seek bar 370, since both metadata clips 115a-115b refer to the same media file 135a, but at different positions. However, since only one selection may be playing back at a time, the inactive selection might be grayed out to visually indicate that it is not the presently active selection.

Besides supporting playlist playback, the player interface depicted in display 350 could also support, via user input read from input device 329, the creation and editing of playlists and metadata clips as well. Input device 329 may comprise, for example, a keyboard, a pointing device such as a mouse, a pointer for use with a touchscreen, or some other input device providing user input. Processor 328 executing web browser 326 on client 325 may then detect the user input from input device 329. This user input may then be forwarded to media player service 321 executing on processor 323 of web server 320, depending on whether the user input may be handled solely on the client side via web browser 326, or whether the server side driven by media player service 321 is also necessary. For example, web browser 326 may be able to solely handle local events such as moving a cursor across display 350, but user input affecting external data such as playlist 340 may need to be sent to media player service 321 for further processing.

For example, start position 375 and end position 376 might be clicked and dragged across seek bar 370 via input device 329 to define start position 375 and end position 376, with selection 377 updated accordingly. The underlying referenced start position and referenced end position may also be updated in the relevant referenced metadata clip in playlist 340. Video window 360 might be clicked and dragged into playlist window 380 using input device 329 to add the presently playing metadata clip to playlist 340, or items from playlist window 380 might be clicked and dragged into a trashcan icon using input device 329 to remove items from playlist 340. Additional player interface elements might be added to support adding subtitles, referencing outside audio sources, linking to other playlists, adding user-defined custom event behaviors, and other editing and creation facilities. By utilizing metadata clips to support these features and event behaviors, server resource usage can be optimized without the need to generate and store separate media file copies.

Figure 4:
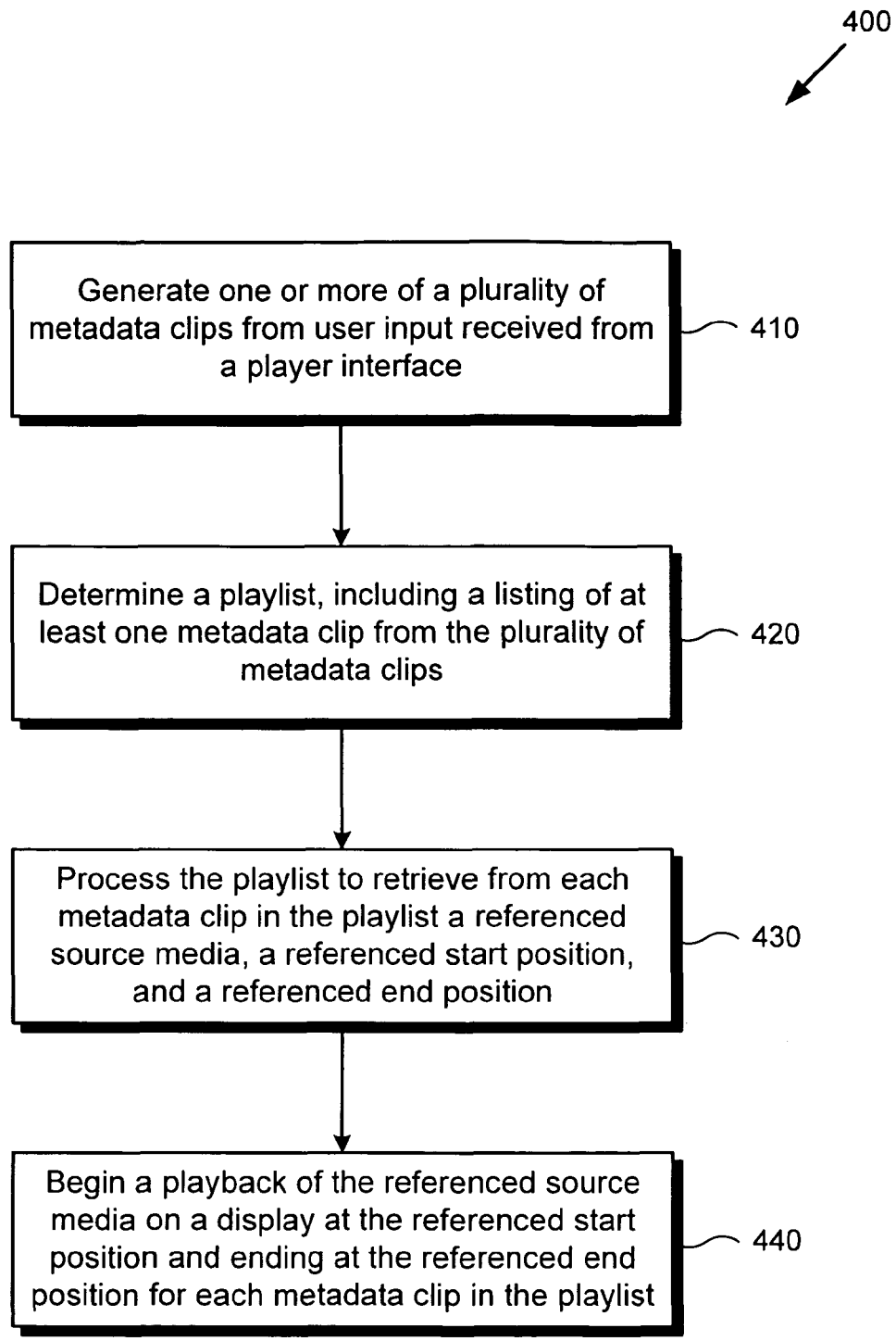
FIG. 4 shows a flowchart describing the steps, according to one embodiment of the present invention, by which a media device can provide one or more media files for a display using metadata clips.

FIG. 4 shows a flowchart describing the steps, according to one embodiment of the present invention, by which a media device can provide one or more media files for a display using metadata clips. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 300 of FIG. 3, step 410 of flowchart 400 comprises web server 320 generating one or more of a plurality of metadata clips from user input of input device 329 received from a player interface displayed by web browser 326 on display 350. A user at client 325 might search various media files from media server 330 to assemble playlist 340, providing start position 375 and end position 376 for metadata clips referencing those media files. By using input device 329, which may comprise a keyboard and a pointing device such as a mouse, the user can manipulate the player interface shown on display 350. In this manner, the user can move start position 375 and end position 376 to create selection 377 for each media file referenced in playlist window 380. In turn, web browser 326 executing on processor 328 of client 325 can notify media player service 321 executing on processor 323 of web server 320 to store the newly created metadata clips in playlist 340.

Besides generating one or more metadata clips for playlist 340, existing metadata clips may also be added to playlist 340. For example, examining FIG. 1, media database 110 already contains metadata clips 115a-115c, which may have been previously generated by fellow users or moderators. Processor 123 of web server 120 may then execute a search query through media player service 121 to retrieve metadata clips from media database 110 matching certain user specified criteria, such as genre or author. Matching metadata clips may then be added to playlist 340, in addition to any metadata clips newly generated by the user.

Referring to step 420 of flowchart 400 in FIG. 4 and environment 300 of FIG. 3, step 420 of flowchart 400 comprises web server 320 determining playlist 340, including a listing of at least one metadata clip from the plurality of metadata clips of step 410. For example, the user may input device 329 to add and remove metadata clips in playlist window 380, which may correspond to a listing of metadata clips in playlist 340. Alternatively, other users or moderators might assemble predetermined playlists, such as playlists 240a-240b of FIG. 2, for browsing and selection by the user of client 325. For the purposes of the present example, step 420 may determine playlist 340 to be the same as playlist 240a of FIG. 2.

Referring to step 430 of flowchart 400 in FIG. 4 and environment 200 of FIG. 2, step 430 of flowchart 400 comprises web server 220 processing playlist 240a to retrieve metadata clips 215a-215d for playback at the referenced start and end positions. Thus, media player service 221 may stream to web browser 226 the video and audio streams indicated by playback script 241a. Audio stream 236d of media file 235d, or "Soundtrack.mp3," is streamed to web browser 226. Concurrently and in sequential order, three video streams are also sent to web browser 226. First, position 00:00:20.000 to 00:01:15.000 from video stream 237a of media file 235a, or "Cats.avi," is streamed to web browser 226. Second, position 00:02:00.000 to 00:03:00.000 from video stream 237b of media file 235b, or "Dogs.avi," is streamed to web browser 226. Third, position 00:01:30.000 to 00:02:30.000 from video stream 237c of media file 235c, or "Penguins.avi," is streamed to web browser 226. As web server 220 can intelligently stream the above referenced media files, separate media files do not need to be generated and stored, optimizing server resource usage.

Referring to step 440 of flowchart 400 in FIG. 4, environment 200 of FIG. 2, and environment 300 of FIG. 3, step 440 of flowchart 400 comprises web server 320 beginning a playback on display 350 according to the processed playlist of step 430. Thus, media player service 221 of web server 220 may direct client 225 to playback on display 350, via web browser 226, video streams 237a-237c sequentially at the indicated start and end positions, while concurrently playing back audio stream 236d through an audio output device attached to client 225, which may, for example, be integrated into display 350. In this manner, the user of client 325 can view, edit, and enjoy selections of media from a wide variety of different source media on display 350. Additionally, depending on the settings of playlist 340, various event behaviors can also be supported to provide flexible behaviors beyond standard start to finish playback.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A media device for providing one or more media files for a display using a plurality of metadata clips, wherein each of the plurality of metadata clips references a referenced source media from the one or more media files, a referenced start position in the referenced source media, and a referenced end position in the referenced source media, the media device comprising:
   a hardware processor configured to:
      determine at least one capability of a client;
      determine a playlist including a listing of at least two metadata clips and associated attributes corresponding to source quality information and popularity of the referenced source media for each of the at least two metadata clips, from the plurality of metadata clips using the at least one capability of the client, wherein the playlist references a video stream, a separate audio stream and the associated attributes; and
      process the playlist without generating a new media file to retrieve from each of the at least two metadata clips in the playlist the referenced source media, the referenced start position, and the referenced stop position, for a playback to begin at the referenced start position and end at the referenced end position, wherein the processing includes transitional effects between the at least two metadata clips retrieved in the playlist, wherein a more popular of the at least two metadata clips is sequenced in the playlist first if an individual selection is not made;
      wherein the playlist further includes one or more event behaviors, and wherein each of the one or more event behaviors have one or more attached conditions;
      wherein the hardware processor is configured to process the playlist while implementing the one or more event behaviors, and wherein the hardware processor is configured to monitor for a completion of the one or more attached conditions before implementing the one or more event behaviors.

2. The media device of claim 1 further comprising a memory storing the plurality of metadata clips.

3. The media device of claim 1, wherein the media device is in communication with the client over a communication network, and wherein the hardware processor is of a server configured to provide the playback over the communication network to of the client for displaying on a display.

4. The media device of claim 1, wherein the media device is in communication with a server over a communication network, and the hardware processor is of the client configured to obtain the playback over the communication network for displaying on a display.

5. The media device of claim 1, wherein each of the plurality of metadata clips references a different referenced source media.

6. The media device of claim 1, wherein each of the plurality of metadata clips is associated with a database record in a database, and wherein the hardware processor is configured to determine the playlist using the database.

7. The media device of claim 6, wherein each of the database records in the database references one or more tags describing an associated metadata clip of the plurality of metadata clips.

8. The media device of claim 1, wherein the hardware processor is configured to generate one or more of the plurality of metadata clips from user input received from an input device.

9. The media device of claim 1, wherein the one or more event behaviors include a continuing playback after the process of the playlist, wherein the continuing playback begins using a referenced source file and a referenced end position of a last metadata clip of the listing.

10. The media device of claim 1, wherein the one or more event behaviors include terminating the process of the playlist after a predetermined time.

11. The media device of claim 1, wherein the playlist references one or more external playlists, and wherein the hardware processor is further configured to process the one or more external playlists recursively.

12. A method for use by a media device to provide one or more media files for a display using a plurality of metadata clips, wherein each of the plurality of metadata clips references a referenced source media from the one or more media files, a referenced start position in the referenced source media, and a referenced end position in the referenced source media, the method comprising:

determining, by a computing device, at least one capability of a client;

determining, by the computing device, a playlist including a listing of at least two metadata clips and associated attributes corresponding to source quality information and popularity of the referenced source media for each of the at least two metadata clips, from the plurality of metadata clips using the at least one capability of the client, wherein the playlist references a video stream, a separate audio stream and the associated attributes; and processing, by the computing device, the playlist without generating a new media file to retrieve from each of the at least two metadata clips in the playlist the referenced source media, the referenced start position, and the referenced stop position, for a playback to begin at the referenced start position and end at the referenced end position, wherein the processing includes transitional effects between the at least two metadata clips retrieved in the playlist, wherein a more popular of the at least two metadata clips is sequenced in the playlist first if an individual selection is not made;

wherein the playlist further includes one or more event behaviors, and wherein each of the one or more event behaviors have one or more attached conditions;

wherein the processing of the playlist includes implementing the one or more event behaviors and monitoring for a completion of the one or more attached conditions before implementing the one or more event behaviors.

13. The method of claim 12, wherein the determining of the playlist includes using a database having each of the plurality of metadata clips associated with a database record.

14. The method of claim 12, further comprising, prior to determining the playlist, generating one or more of the plurality of metadata clips from user input received from a player interface.

15. The method of claim 12, wherein the processing of the playlist begins the playback of the source media on the display at the referenced start position and ends the playback on the display at the referenced end position.

16. The method of claim 12, further comprising processing recursively one or more referenced playlists from the playlist.

* * * * *